April 6, 1948.  A. R. WURTELE  2,439,278
HARVESTER LOADER
Filed Feb. 25, 1942  4 Sheets-Sheet 1

INVENTOR
Allan R. Wurtele
BY
F. Bascom Smith
ATTORNEY

April 6, 1948.  A. R. WURTELE  2,439,278
HARVESTER LOADER
Filed Feb. 25, 1942  4 Sheets-Sheet 2

INVENTOR
Allan R. Wurtele
BY
F. Bascom Smith
ATTORNEY

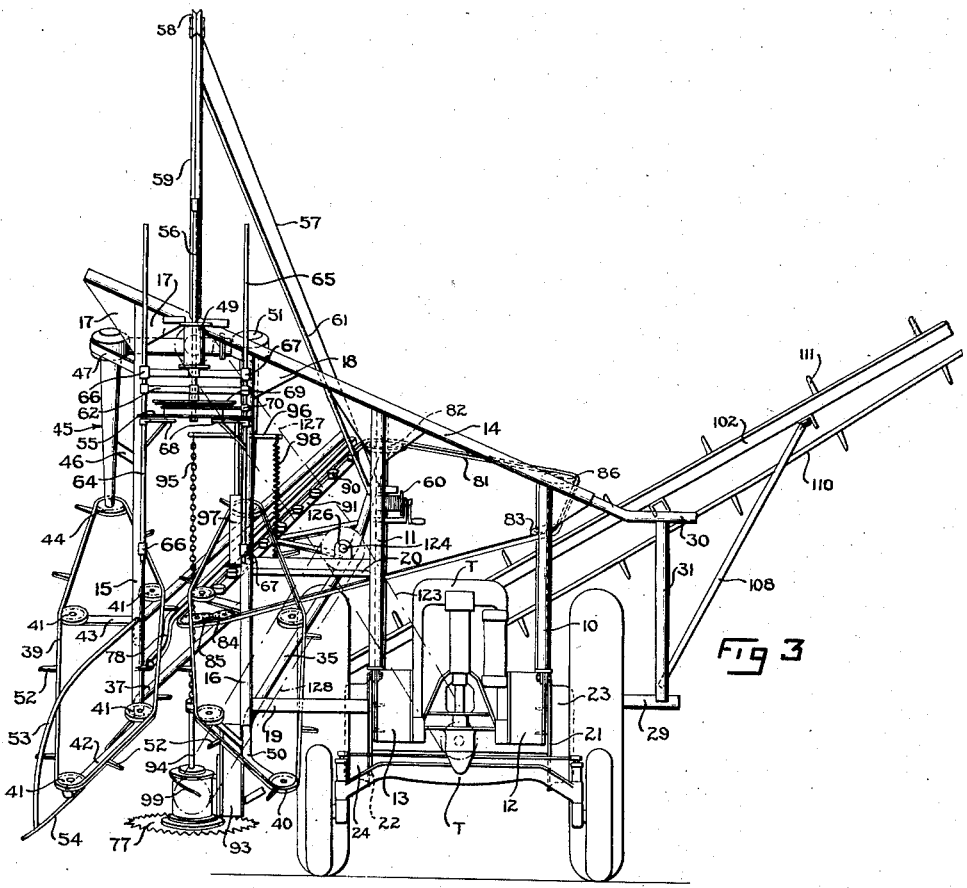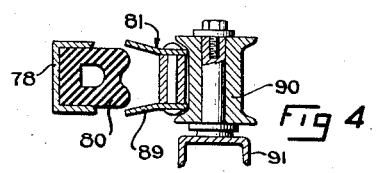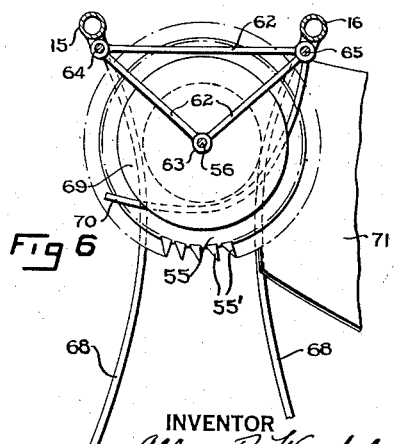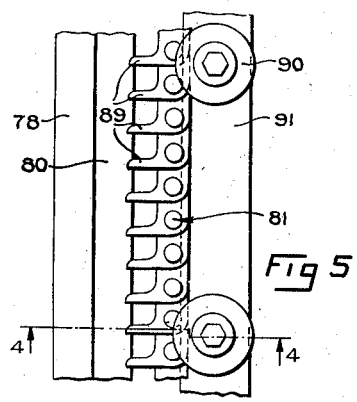

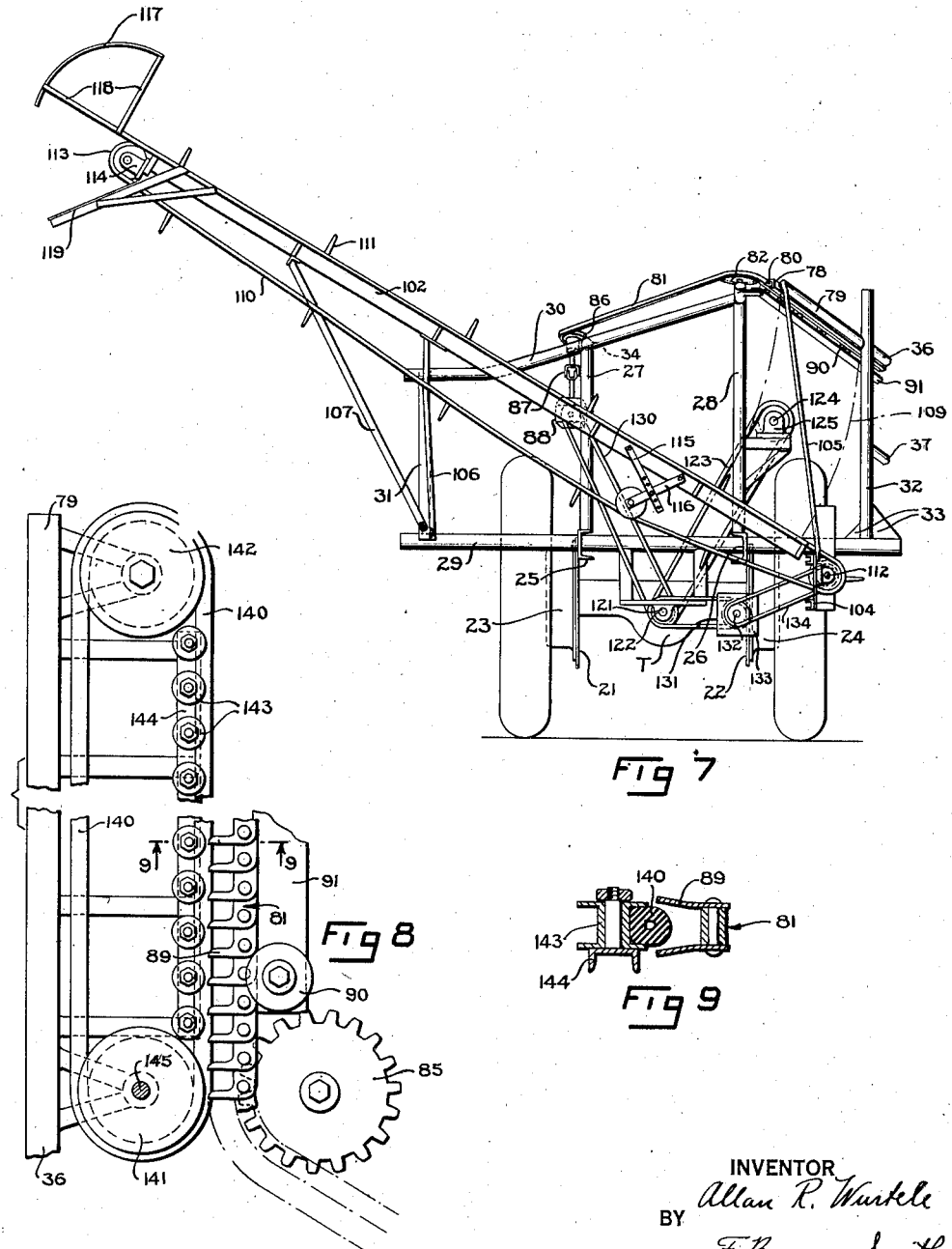

Patented Apr. 6, 1948

2,439,278

UNITED STATES PATENT OFFICE 2,439,278

HARVESTER-LOADER

Allan R. Wurtele, Mix, La.

Application February 25, 1942, Serial No. 432,203

16 Claims. (Cl. 56—17)

This invention relates to apparatus for gathering growing crops and more particularly to power-driven machinery adapted for both harvesting and loading crops constituted by plants having elongated stalks, such as sugar cane and the like.

One of the objects of the present invention is to provide a novel mechanical harvester-loader by means of which sugar cane and similar crops may be rapidly and economically harvested and loaded for immediate removal to market in a single operation.

Another object of the invention is to provide a novel harvester for sugar cane whereby the sugar-bearing portion of the cane plants may be readily and rapidly segregated from the other portion of the plants with a minimum of waste.

Still another object is to provide mechanical harvesting apparatus having novel means for conveying stalks whereby the latter are conveyed in a relatively upright position without material longitudinal slippage and without appreciable damage to the stalks.

A further object is to provide, in a cane harvester, novel means for receiving the cane stalks from the conveyor mentioned above and for loading the same into a market-going vehicle moving along with the harvester in a neat and convenient manner whereby substantially maximum loading of said vehicles is insured.

Still another object is to provide a harvester for sugar cane having novel cutting means for the cane plants whereby the percentage of sucrose in the marketable sugar-bearing portion of said plants may be quite accurately controlled.

A still further object is to provide novel harvesting and loading means for sugar cane or the like which may be readily mounted on a standard four-wheel tractor in such a manner as to be readily removable therefrom to thus render the latter available for other uses.

Another object is to provide a novel cane harvester-loader wherein all of the principal moving parts are driven by the same power means that propel the harvester through the field.

An additional object is to provide a cane harvester which is so constructed that the upper ends of the cane plants may be collected and cut up into ensilage during movement of the harvester through the field.

Another object is to provide novel means whereby waste portions of harvested plants, such as the portions of sugar cane having a low sugar content, may be employed for providing a traction surface for the wheels of the harvester.

A further object is to provide, in a harvester, novel apparatus for removing the upper portions of the harvested plants.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a top plan view, with parts broken away, of one form of harvester-loader embodying the present invention, some parts being shown diagrammatically in the interest of clarity;

Fig. 3 is a similar front view of said apparatus with parts removed, especially at the rear, to avoid confusion;

Fig. 4 is a detail sectional view of one form of conveyor which may be employed, the section being taken substantially on line 4—4 of Figs. 1 and 5;

Fig. 5 is a detail top view showing a portion of said conveyor;

Fig. 6 is a detail plan view, partly in section and with parts broken away, of the novel topping mechanism of the harvester;

Fig. 7 is a rear view of the apparatus of Fig. 1 with parts constituting the forward portion of the harvester broken away or removed;

Fig. 8 is a detail plan view, with parts broken away, showing an alternate embodiment of the conveyor means; and, Fig. 9 is a sectional view taken substantially on line 9—9 of Fig. 8.

Figure 1:
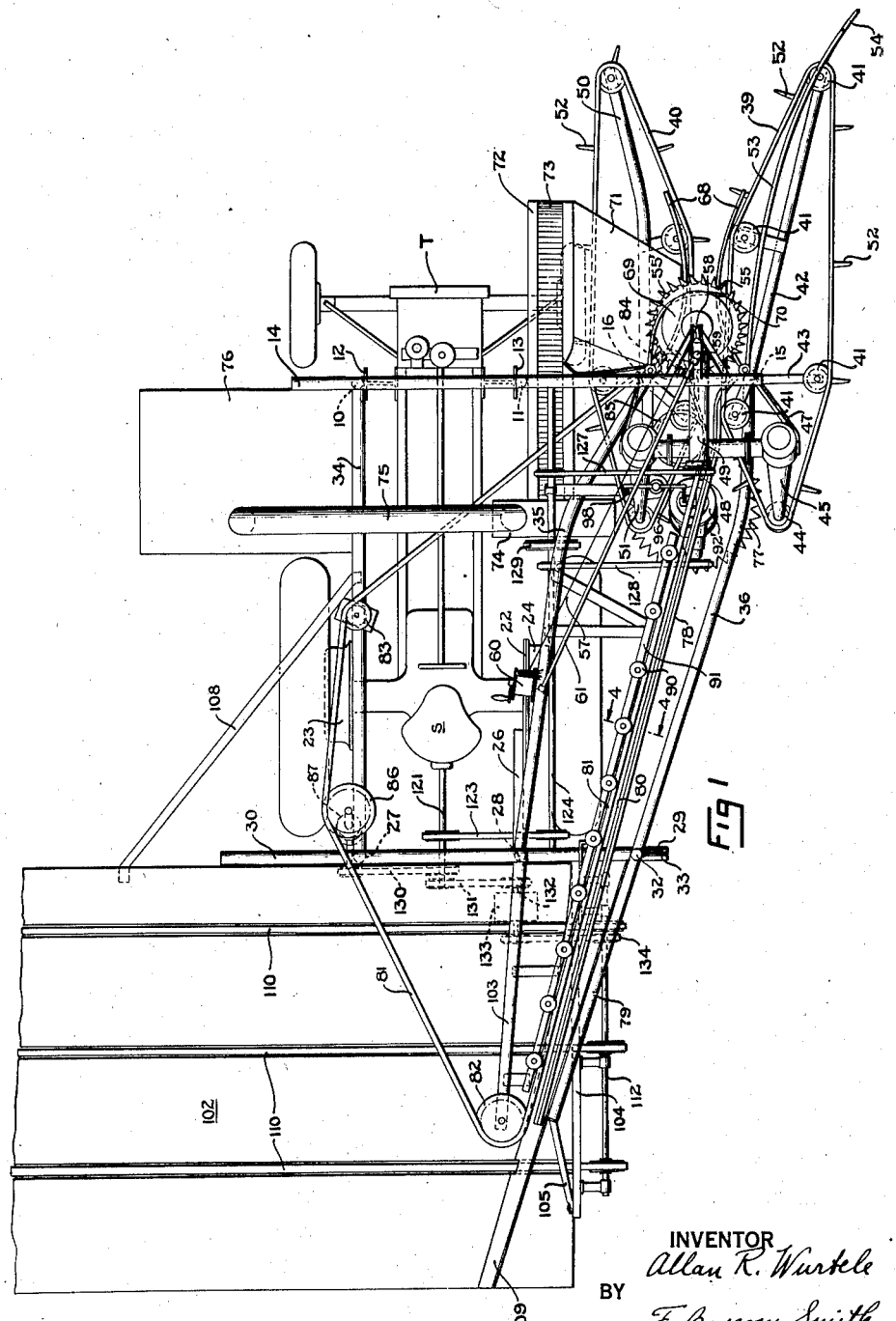

In the single embodiment of the invention illustrated in the drawings, by way of example, a simply constructed, light-weight frame of comparatively open construction is removably mounted on the chassis of a standard, four-wheel, power-driven tractor. Said frame accommodates all of the harvesting and loading mechanism of the apparatus and is mounted on the tractor with said mechanism arranged to insure good balance for the entire apparatus with respect to the supporting wheels of the tractor, thereby rendering the machine readily maneuverable in soft cane fields or the like. All of the moving parts of the harvester-loader combination contemplated by the invention are preferably driven by the tractor engine, which also propels the machine through the field, thereby insuring proper timing of the power-driven parts with respect to the movement of the harvester and making it unnecessary to provide more than one power source.

The frame structure preferably supports power-driven gathering or pick-up means for erecting those cane stalks which may be growing at an angle to the vertical and for guiding the stalks into engagement with a cutting mechanism which removes the tops or upper end portions of the cane plants, including the upper leaves or bush portion, and such part of the stalks themselves as may have too low a sugar content to warrant processing. As the harvester moves forward, the stalks of one row, which have been wholly or partially stripped of their leaves, either by hand or by mechanical means on the harvester, are gripped by novel conveying means, and at about the same time are severed near the roots by a power driven cutter also supported by the frame structure.

The stalks thus stripped, topped and cut are ready for processing at the sugar mill and are moved by the conveying means to the rear of the harvester and deposited in a horizontal position, with the length thereof extending in the direction of movement of the harvester, on an inclined loading platform carried by the frame structure and extending upwardly and transversely across the rear of the tractor. The fresh-cut stalks are moved along the loading platform by elevator chains or belts and dropped over the upper edge of said platform into a cart or other conveyor for immediate transportation to the sugar mill.

The removable frame structure mentioned above is secured in the illustrated embodiment on a standard McCormick-Deering Farmall tractor T and comprises a front arch, including two vertical supporting members 10 and 11, which are preferably bolted or otherwise rigidly secured to I-beams 12 and 13, which are in turn welded or otherwise suitably secured to the tractor chassis near the forward end thereof. Sloping upwardly to the left, as viewed from the front of the tractor in Fig. 3, is a cross beam 14 secured, as by welding, to the upper ends of posts 10 and 11. Rigidly secured to and depending vertically from the overhanging outer end of beam 14 are two spaced posts 15 and 16 to form an arch through which the cane stream passes to the conveyor mechanism therefor. Member 15 is braced against lateral movement by angle plates 17, 17 and member 16 is similarly braced by angle plate 18 and two vertically spaced horizontal beams 19 and 20 extending between said last-named member and vertical supporting means 11, 13.

The rear portion of the harvester frame is supported on the tractor by means of plates 21, 22, which have U-shaped slots for receiving the rear axle housing of the tractor, and are bolted to the rear wheel drive housings 23 and 24, respectively, of the tractor. Welded or otherwise suitably secured to these plates are two rearwardly extending horizontal beams 25 and 26 which are of channel or other suitable section. These beams support a pair of vertical posts 27 and 28 and a horizontal cross beam 29. Said posts have a transverse beam 30 secured to the upper ends thereof and the latter is connected at its left end, as viewed from the rear of the harvester in Fig. 7 to the end of cross beam 29 by a vertical brace 31. At the other end of beam 29 is a vertical post 32 which may be laterally braced by any suitable means, such as angle plates 33.

Figure 2:
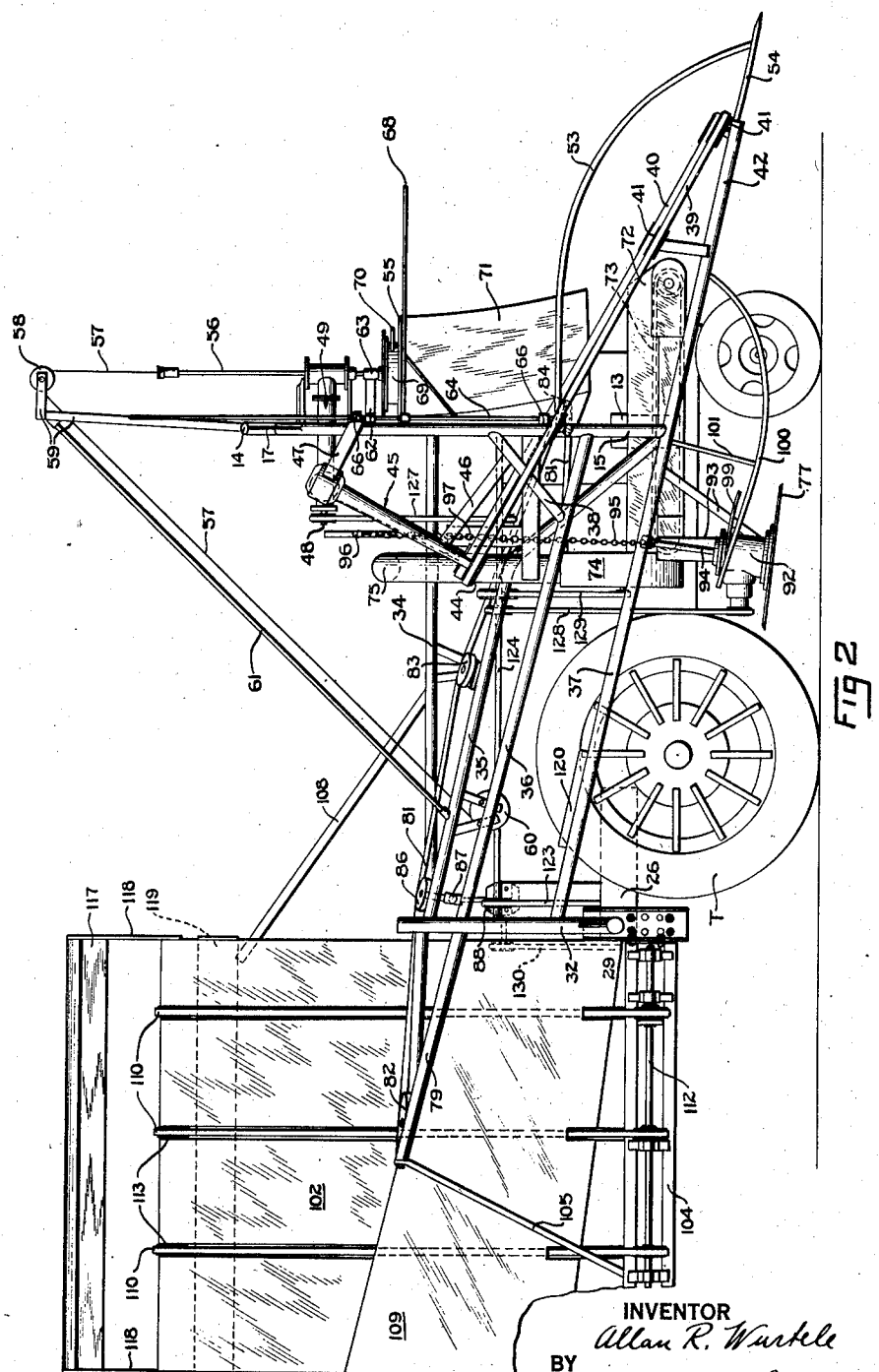
Fig. 2 is a similar side view of the apparatus of Fig. 1.

The front and rear frameworks above-described are connected to each other and, hence, braced against fore and aft movement by a beam 34 joining the upper ends of posts 10 and 27, a rigid bar 35 which extends forwardly and downwardly from adjacent the upper end of post 28 to a point adjacent the lower end of depending support 16, and two vertically spaced parallel bars 36 and 37 which also extend forwardly and downwardly from post 32 to depending support 15, beam 36 being supplemented by a brace 38 (Fig. 2).

Supported by the forward portion of the harvester frame at the right side of the tractor, as viewed from the driver's seat S, are means for gathering and erecting the cane plants and guiding the same into a conveyor to be hereinafter described, said means comprising a pair of endless pick-up or gathering chains 39 and 40. Chain 39 operates in a rearwardly inclined plane on a plurality of sprockets or idler gears 41, which are variously mounted on a forward extension 42 of rod 37, on a laterally extending bracket 43, and on the forward end of bar 36. Said chain is driven by a sprocket 44 on the lower end of a shaft journaled in a housing 45 which also houses suitable bevel gearing of the character commonly used in rear wheel drives or differentials of automobiles. This gear housing is set at an angle to the vertical and is secured by brackets 46, 47 to the main frame (Fig. 2). The gearing in said housing is drivably connected by means of a suitable shaft and gearing to a horizontal rotatable shaft 48 which extends in the direction of movement of the harvester and is journaled in a housing 49, said shaft being drivably connected with the engine of tractor T by means to be hereafter described.

The left-hand gathering or pick-up chain 40 is mounted in a manner similar to chain 39, the forward part thereof being supported by a forwardly extending arm 50 secured to the lower end of post 16. Chain 40 is also driven from shaft 48 through suitable bevel gearing in a housing 51, which is similar to housing 45. Chains 39 and 40 are provided with laterally extending prongs or lugs 52 for engaging the cane stalks. The adjacent portions of these chains converge to bring the cane stalks of each row together in a relatively vertical position and to guide the same into the harvester in a satisfactory way.

In addition to the movable pick-up chains which are driven in unison with the movement of the harvester through the field, stationary pick-up arms may also be provided. In the illustrated embodiment, one such arm or pick-up means is constituted by a rod 53 that extends forwardly and downwardly from post 15 to join a rod 54 that is secured to the outer end of chain supporting member 42. Rods 53, 54 may be suitably curved in several planes to adapt the same for gradually lifting the cane plants to a vertical position as the harvester moves forward relative thereto. Similar stationary pick-up means may be mounted above chain 40 but the same are omitted from the drawings to avoid any confusion.

Although mechanical means may be provided on the harvester for stripping leaves from the plant stalks before and/or after the same are severed from their roots, it has been found to be practical to strip the main or lower portion of the stalks of their leaves in advance of the harvester by manual means. This may be readily and satisfactorily accomplished by the use of a tool having a plurality of parallel prongs on a long handle, such as a pitchfork.

As the harvester moves forward and plants are lifted to a relatively vertical position, if they are not growing in such position, the upper or bush portions thereof are guided to the forward edge of a novelly constructed and mounted cutting means whereby the upper leaves and a suitable portion of the stalk are cut away. Said cutting means, in the form shown, comprises a vertically adjustable, substantially horizontal, circular cutter 55, which preferably has a sharpened, sawtoothed periphery. If desired, the cutting teeth 55' may be separately formed and welded to disc 55. The cutter is supported by a vertically disposed rotatable shaft 56, which is splined or keyed for rotation with and axial movement relative to a sleeve that is rotatably mounted in the forward part of housing 49, said sleeve being drivably connected in any suitable manner, such as by bevel gearing, to horizontal shaft 48. For vertically adjusting cutter 55, a cable 57 may be connected to the upper end of shaft 56 in any suitable manner to permit relative rotation, passed over a sheave or roller 58 secured to the upper end of a boom 59, and thence connected to a rotatable drum 60 operable by the tractor operator. Boom 59 may be braced by a guy rod 61.

The cutter 55 is preferably steadied and guided in its vertical movement by a triangular-shaped bracket 62 having a bearing or bushing 63 which surrounds shaft 56 a short distance above the cutter. Bracket 62 is rigidly secured to a pair of spaced, parallel guide rods 64 and 65 that slide vertically in spaced bushings 66 and 67, respectively, which are stationarily mounted on posts 15 and 16. Bushing 63 is accordingly adapted to move up and down with the cutter and thus provide rigid, lateral support therefor. If desired, rods 64, 65 may be stationarily mounted, in which event bracket 62 would have sliding engagement with said rods.

For the purpose of further insuring proper topping of the cane plants, a pair of diverging gathering arms 68 are mounted for vertical movement with cutter 55, such as by being welded to and braced with respect to rods 64 and 65. These arms direct the upper portions of the plants into contact with the central, forward edge of the cutter to render the latter most effective.

In order to prevent the severed leaves from wrapping themselves around shaft 56, a drum 69 is mounted thereon for rotation therewith. The periphery of said drum is preferably channel-shaped in section and a deflector arm 70 extends into the channel from rod 65 to direct the severed parts of the cane plants onto a shield or chute 71 whereby said parts are preferably directed into a trough 72 in which an endless belt conveyor 73 operates. Said trough and conveyor constitute part of a hammer-mill or silage chopper, which is diagrammatically illustrated at 74. This hammer-mill or chopper may be of any suitable known design or construction and may be supported in any suitable manner on the chassis of tractor T and the framework of the harvester. If desired, for example, chopper 74 may be mounted on the forward left-hand corner of the tractor with trough 72 extending across the front of the tractor to a point beneath chute 71.

The leaves and tops from the cane plants are carried into the chopper by conveyor 73 and the chopped silage or feed is blown out through conduit 75 into a container or bin 76 (Fig. 1) mounted on the left side of the tractor just ahead of the rear wheel. The bin may be emptied either by dumping or unloading whenever the same is filled or after each row of cane is harvested. The silage thus obtained constitutes valuable feed for cattle and similar animals. The removal of the portion of the cane plants from the field also avoids the necessity for burning to destroy the winter home, so to speak, of the cane-borers which normally live during the winter months in the chopped-off upper ends of the cane stalks. If desired, of course, the severed upper ends of the stalks may be directed into a container and removed from the field without being chopped. It might also be desirable, particularly when it is muddy, to direct the cut portions of the plants into the path of the tractor wheels to provide a traction surface therefor. The silage chopper and the parts associated therewith are removed from the harvester in Fig. 3 to avoid unnecessary confusion in the drawing.

The stripped and topped stalks of the cane plants are next guided into a novel conveyor mechanism which is adapted to grip each stalk intermediate its ends, preferably at substantially the same instant or shortly before the stalk is engaged or cut by a rotating cutter 77. As shown, the conveying means comprises an elongated channel beam 78 suitably mounted on the frame structure and extending rearwardly, upwardly and preferably inwardly toward the tractor from the arch 14, 15, 16. Channel 78 is preferably supported by means of brackets from beam 36 and a rearward extension 79 thereof. Stationarily mounted in and projecting from channel 78 are resilient means which are shown as being constituted by a hollow resilient strip 80 of rubber or the like. The outer face of strip 80 may be plane or curved but the same preferably has two or more longitudinally extending corrugations (Fig. 4) to facilitate gripping of the cane stalks. Cooperating with resilient strip 80 is an endless power-driven chain 81 or the like, said chain being mounted on idler sprockets 82, 83, 84 and 85 and is driven by a sprocket 86, which is in turn drivably connected to the tractor engine through a universal joint 87 and suitable bevel gearing disposed in a housing 88. That portion of the conveyor chain between sprockets 84 and 85 may extend forward sufficiently far to take the place of pick-up chain 40, if desired, and that portion between sprockets 82 and 85 parallels resilient strip 80 and is sufficiently close to the latter to grip cane stalks therebetween. Chain 81 preferably has laterally extending prongs or lugs 89 (Figs. 4 and 5) which extend between successive cane stalks and preferably overlap strip 80 for assisting in the movement of the stalks along said strip by the chain.

Novel means are also provided for obviating any undue sagging, climbing, or lateral bulging of the conveyor chain relative to strip 80 which might result in downward slippage of the stalks. For reasons which will appear more fully hereafter, it is important to prevent any material longitudinal slippage of the stalks in the conveyor 80, 81. In the form shown, said means includes a plurality of spaced rollers 90 mounted on a rigid member 91 that is in turn supported by the harvester frame. Each of said rollers has a channel-shaped periphery, the upper and lower flanges of which extend above and below a portion of the conveyor chain 81 to prevent sagging or climbing thereof. The rollers are also positioned to obviate any undue bulging of the conveyor chain away from strip 80 when cane is being conveyed. If desired, rollers 90 may be replaced by a channel beam or the like so positioned that the active portion of chain 81 will run in the trough thereof.

As pointed out above, each stalk is cut near the ground at approximately the same time that it enters and is gripped by conveyor 80, 81. The cutting means for this purpose is constituted by the vertically adjustable rotating disc cutter 77 which preferably has a saw-toothed periphery. This cutter may be tilted slightly from the horizontal and is driven through suitable bevel gears located in a housing 92, said gearing being operatively connected with the tractor engine in a manner to be hereafter described. Housing 92 is fixedly suspended from the harvester frame by means, such as struts 93 (Fig. 2) at a point beside the tractor and just ahead of the rear wheels thereof. Shaft 94, on which cutter 77 is mounted, may be keyed or splined to the gearing in housing 92 for rotation therewith but is adapted to slide vertically to thereby permit vertical adjustment of the cutter. Said shaft and cutter are supported by a chain or cable 95 in such a manner that the shaft may rotate relative to the chain, the latter being attached at its upper end to a cross bar 96 on the piston rod of a hydraulic jack 97 whereby the cutter is held against downward movement. Cutter 77 is free to move upwardly at all times against the yieldable force of a spring 98 (Fig. 3) which is normally under tension and is interposed between cross bar 96 and a stationary part of the harvester. This spring accordingly serves to yieldably hold cutter 77 in a desired position and yet permits free upward movement thereof in case it strikes an obstacle along the ground.

In order to guide the lower ends of the cane stalks around gear housing 92, a guide rail 99 is secured to the latter. This rail is preferably curved and projects forwardly and inwardly toward the tractor from the outside edge of said housing. A guide rail 100, 101 (shown only in Fig. 2) may also be provided for the purpose of protecting personnel from the rotating cutter 77.

The stalks, after being severed by bottom cutter 77, are carried rearwardly and upwardly in a relatively upright position by the conveying means 80, 81 to a novel loading table or platform 102. As the stalks approach the forward edge of the platform, the lower ends thereof strike and drag against transverse beam 29, or a suitable guide or shield which may be provided, while the upper ends of the stalks are carried out to the end of the conveyor which is supported above a central portion or platform 102 by arm 79 and a rearward extension 103 of beam 35. Thus, when the stalks are released by conveyor 80, 81, the same fall in a horizontal position with the lengths thereof extending generally in the direction of movement of the harvester, i. e., they are dropped laterally across the width of loading table 102.

Said table or platform is made as wide as necessary—usually about eight feet—and is inclined toward the left across the rear of the harvester, as viewed from behind (Fig. 7). The lower end of the platform is supported by a horizontal beam structure 104 which is made up of two parallel channel bars and a connecting plate (see Fig. 7). Said beam structure is secured at one end to cross beam 29 and is supported by a tie rod 105 interposed between the outer end thereof and the outer end of extension 79. Further support for the platform is afforded by a beam extending rearwardly from post 27 and by braces 106, 107 (Fig. 7) and 108 (Fig. 2). If desired, a shield 109 may be provided near the lower end of platform 102 against which the stalks may fall when released by the conveyor. The shield assists in lining the stalks up across the platform and prevents the same from sliding off the bottom of the platform until they are picked up by the conveyor chains or belts to be next described.

Means are provided for moving the cane stalks up the inclined surface of loading table 102 and releasing the same to fall in a cart or suitable vehicle moving along the side of the harvester. In the illustrated embodiment, three endless link belts 110 constitute the means for elevating the stalks and moving the same across the rear of the harvester, said belts having spaced prongs or lugs 111 (Figs. 3 and 7) for engaging the stalks, corresponding lugs on the several belts being in alignment across the platform for simultaneously engaging the same stalk. Chains 110 are driven by sprockets on a cross shaft 112 and are supported at the top of the loading table by idler sprockets 113 mounted in suitable brackets 114. Suitable means comprising pivoted arms 115, 116 (Fig. 7) adjustably coupled together may be employed for adjusting the tension of the elevator conveying chains 110.

As the stalks reach the upper end of the loading table, they are straightened, if they happen to be traveling in a diagonal position, by an arcuate hood 117 supported by brackets 118 at the end of said platform. When the stalks reach the end of table 102, the same are released to fall on a chute 119 (Fig. 7) which assists in directing the stalks into a cart (not shown). If desired, means may be provided on opposite sides of loading table 102 and at one side of the harvester as at 120 (Fig. 2) on which men may stand for the purpose of taking care of any irregularities in the conveying of the cane by the conveying mechanisms.

All of the moving parts of the harvesting-loading mechanism are preferably driven from the engine of tractor T. For this purpose, the drive shaft of the tractor is extended rearwardly at 121 (Fig. 1) and supported in a bearing 122 suspended from beam 29 (Fig. 7). This shaft extension is provided with several sprockets, one of which is connected by a chain 123 to a sprocket on a fore and aft shaft 124 supported in bearings at 125 (Fig. 7) and 126 (Fig. 3). From shaft 124, chain drives 127, 128 and 129 are taken, respectively, to horizontal shaft 48, a horizontal shaft extending into gear housing 92 of the bottom cutter 77 and the main shaft of hammermill or chopper 74. Another sprocket on shaft 21 is connected by a chain 130 to the power-transmitting means 88 through which power is transmitted to sprocket 86 for driving conveyor chain 81. A third sprocket on shaft 121 is connected by a chain 131 with a stub shaft 132 that is in turn drivably connected with shaft 104 through a suitable reversing gear mechanism shown diagrammatically at 133 and a chain 134.

A modified form of stalk conveyor is illustrated in Figs. 8 and 9, the same differing from conveyor 80, 81 only in that the stationary strip 81 is replaced by a movable endless member 140 made of rubber or other suitable yieldable material which will frictionally engage the cane stalks. In the form shown, member 140 is tubular and runs in a pair of grooved wheels 141 and 142 which are supported on suitable brackets from beams 36, 79. The portion of member 140 which runs adjacent to chain 81 is further supported by a plurality of grooved rollers 143 mounted for rotation about vertical pins secured to a beam 144 that is, in turn, supported by brackets extending from members 36 and 79. If desired, rollers 143 and wheels 141, 142 may be mounted on roller or ball bearings to permit very free movement of endless member 140. It may also be desirable to extend a shaft 145 upwardly from wheel 141 and drivingly connect the same to the tractor engine, such as through shafts 48 and 124.

There is thus provided a novel harvester-loader for sugar cane or like crops whereby the same may be rapidly and economically harvested and simultaneously loaded in a vehicle for immediate delivery to the sugar mill or other destination. Said harvester embodies novel means for topping the plants to insure a desired percentage of sucrose in the marketable stalk and for chopping and preserving the tops for feed. A novel combination of conveying and elevating means are also provided whereby the harvested stalks are neatly loaded in a vehicle as fast as the same are cut and without appreciable damage to the stalks. The apparatus provided is also so constructed as to be readily and safely maneuverable in soft, plowed fields. Additionally, the entire mechanism is operated by one source of power, i. e., a tractor on which the harvester-loaded parts are wholly and removably supported.

Although only a single embodiment of the invention is illustrated and described in detail, it is to be expressly understood that the same is not limited thereto. Various changes, particularly in the design and arrangement of parts illustrated, may be made without departing from the spirit and scope of the invention, as will now be apparent to those skilled in the art. For a definition of the limits of the invention, reference is had primarily to the appended claims.

What is claimed is:

1. A harvester for cane plants or the like having means for propelling the same through a field, power driven cutting means mounted on the forward part of the harvester for cutting the tops off said plants while the latter are standing in the field, said cutting means comprising a disc-cutter rotatable about a substantially vertical axis, and means for adjusting the vertical position of said cutter above the ground independently of the remainder of the harvester.

2. In a harvester for cane plants or the like, power means for propelling the harvester through a field, cutting means including a disc-like cutter mounted on the harvester for topping said plants while the latter are standing in the field, driving means interposed between said power means and said cutter whereby the latter is rotatably driven, and means for vertically adjusting said cutter relative to said driving means.

3. In a harvester for cane plants or the like, power means for propelling the harvester through a field, and means drivably connected to said power means for topping said plants while the latter are standing in the field, said cutting means comprising a rotatable cutting member having a relatively vertical axis of rotation and being adjustable along said axis.

4. In a harvester for plants having stalks, such as sugar cane, power driven cutting means mounted on the harvester for cutting the tops off said plants adjacent the upper ends of the main body of the stalks, a chopper for cutting up said tops, means for transferring said tops from said cutting means to said chopper, a container mounted on said harvester, and means for transferring the output of said chopper to said container.

5. In a harvester for sugar cane, power means for propelling the harvester through a field, cutting means drivably connected to said power means for cutting the upper portions off the cane plants adjacent the upper ends of the main body of the stalks, means drivably connected to said power means for converting said severed upper portions into silage, and means for directing and conveying said upper portions from said cutting means to said converting means.

6. In apparatus for harvesting cane plants or the like having a frame and power means, the combination of rotatable cutting means having a shaft mounted on said frame for topping said plants, means mounted on said frame for rotatably driving said shaft while permitting axial movement thereof, at least two parallel rod-like members mounted for vertical movement on said frame, a bearing for said shaft adjacent said cutting means, means for rigidly mounting said bearing on said rods, and common means for simultaneously moving said cutter, bearing, rods and shaft axially of the latter as a unit.

7. In a harvester for cane plants or the like, power means, rotatable cutting means mounted on the harvester and driven by said power means for cutting the tops off said plants, and means for directing the disposition of the severed upper ends of said plants including annular channel-shaped means immediately above said cutting means and rotatable therewith.

8. In a harvester for plants having stalks, means for gripping said stalks intermediate the ends thereof and conveying the same in a relatively upright position comprising elongated yieldable means stationarily mounted on said harvester, endless movable means having prongs adapted to straddle said yieldable means, and means for causing movement of said endless movable means longitudinally of and parallel to said yieldable means, and means for guiding said endless movable means to limit the lateral movement thereof relative to said yieldable means.

9. In a harvester for plants having stalks, such as sugar cane plants, means for gripping said stalks intermediate the ends thereof and conveying the same in a relatively upright position comprising elongated yieldable means stationarily mounted on the harvester, an endless chain having a portion thereof adjacent said yieldable means and movable longitudinally thereof, and means for limiting the movement of said chain away from said yieldable means whereby stalks gripped between said chain and said yieldable means are firmly held against slippage in the longitudinal direction of the stalks.

10. In a harvester for plants having stalks, means for conveying said stalks comprising elongated yieldable means stationarily mounted on the harvester, endless movable means adapted to engage the stalks intermediate the ends thereof and move the same along said yieldable means, and means including a plurality of spaced rollers for guiding said endless movable means in its movement along said yieldable means.

11. In a harvester for plants having stalks, such as sugar cane, means for conveying said stalks comprising elongated yieldable means stationarily mounted on the harvester for engaging one side of each stalk, and endless movable means for engaging the opposite side of said stalk to hold the latter in gripping engagement with said yieldable means whereby said stalk is supported, said yieldable means having at least one longitudinally extending groove in the stalk engaging surface thereof.

12. In a harvester for plants having stalks, such as sugar cane, means for conveying said stalks comprising an endless longitudinally movable strip of yieldable material, such as rubber, for engaging one side of each stalk, an endless movable chain for engaging the opposite side of each stalk, whereby each stalk is yieldably gripped between said strip and chain and thereby supported, and power means for driving said chain.

13. In a harvester for plants having stalks, such as sugar cane, means for conveying said stalks comprising an endless longitudinally movable strip of yieldable material, such as rubber, for engaging one side of each stalk, an endless movable chain for engaging the opposite side of each stalk, whereby each stalk is yieldably gripped between said strip and chain and thereby supported, and a common source of power operatively connected to said strip and chain for driving the same in unison.

14. In a harvester having means for propelling the same through a field, means for cutting the stalks of plants, and means for conveying said stalks to the rear of the harvester, the combination of a loading table extending upwardly and transversely across the rear of the harvester for receiving said stalks from said conveying means, a plurality of endless conveyor belts for moving said stalks transversely of the harvester to the upper edge of said table, and means operatively connecting said conveyor belts with said propelling means.

15. In a harvester for plants having stalks, such as sugar cane, power means, means for simultaneously elevating and conveying said stalks transversely across the rear of the harvester in a horizontal position extending lengthwise in the direction of movement of the harvester, means operatively connecting said elevating and conveying means to said power means, and means drivably connected with said power means for delivering said stalks to said elevating and conveying means in said position.

16. In apparatus for harvesting plants having stalks, said apparatus including means for cutting said stalks, the combination of an inclined loading table, movable means associated with said table for moving said stalks to the upper edge of the latter in a horizontal position extending lengthwise in the direction of movement of the apparatus, means mounted on the upper end of said table for directing said stalks into a vehicle when said stalks are released by said movable means, and means for delivering said stalks to said table in said position.

ALLAN R. WURTELE.

REFERENCES CITED

The following references are of record in the file of this patent:

UNITED STATES PATENTS

| Number | Name | Date |
|---|---|---|
| 820,730 | Pessou | May 15, 1906 |
| 903,666 | Becerra | Nov. 10, 1908 |
| 974,776 | Dick | Nov. 8, 1910 |
| 1,121,998 | Gray | Dec. 22, 1914 |
| 1,357,145 | Byrd | Oct. 26, 1920 |
| 1,365,213 | Woodland | Jan. 11, 1921 |
| 1,504,516 | Schmechel et al. | Aug. 12, 1924 |
| 1,572,410 | Paine | Feb. 9, 1926 |
| 1,630,097 | Scranton | May 24, 1927 |
| 1,648,313 | Luce | Nov. 8, 1927 |
| 1,699,252 | Ronning et al. | Jan. 15, 1929 |
| 1,702,551 | Thiemann | Feb. 19, 1929 |
| 1,741,602 | Athey | Dec. 31, 1929 |
| 1,894,412 | Neighbour | Jan. 17, 1933 |
| 1,903,335 | Falkner | Apr. 4, 1933 |
| 1,908,966 | Falkiner et al. | May 16, 1933 |
| 1,936,173 | Orth | Nov. 21, 1933 |
| 2,026,426 | Matejcik | Dec. 31, 1935 |
| 2,157,619 | McElwain | May 9, 1939 |
| 2,188,522 | Alfs | Jan. 30, 1940 |
| 2,280,677 | Wagner et al. | Apr. 21, 1942 |
| 2,281,846 | Klein | May 5, 1942 |
| 2,281,904 | Wurtele | May 5, 1942 |